(12) United States Patent
Winters

(10) Patent No.: US 9,118,637 B2
(45) Date of Patent: Aug. 25, 2015

(54) DUAL-MODE DOWNLOAD MANAGER

(75) Inventor: Derek Alan Winters, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 310 days.

(21) Appl. No.: 13/044,321

(22) Filed: Mar. 9, 2011

(65) Prior Publication Data
US 2012/0233348 A1    Sep. 13, 2012

(51) Int. Cl.
G06F 15/16 (2006.01)
H04L 29/08 (2006.01)

(52) U.S. Cl.
CPC .............. H04L 67/06 (2013.01); H04L 67/34 (2013.01)

(58) Field of Classification Search
USPC .................. 709/232, 201, 202, 203, 223, 238
See application file for complete search history.

(56) References Cited

U.S. PATENT DOCUMENTS

2006/0002294 A1* 1/2006 Chapman et al. ............. 370/229
2009/0187641 A1* 7/2009 Li et al. ......................... 709/220
2011/0055422 A1* 3/2011 Simcoe et al. ................ 709/236

OTHER PUBLICATIONS

Malkin et al. (TFTP Timeout Interval and Transfer Size Options, http://www.rfc-editor.org/rfc/rfc2349.txt).*

* cited by examiner

Primary Examiner — Lan-Dai T Troung
(74) Attorney, Agent, or Firm — Troy A. Van Aacken

(57) ABSTRACT

Methods and apparatuses for automatically changing the mode of download of a download manager in a device are provided. The download manager can send a timeout option to a TFTP server and automatically change the mode of download based on whether a timeout option acknowledgement is received. The download manager can include a first control attribute to enable or disable sending a timeout option to the TFTP server and/or a second control attribute to set the initial download mode of the device.

19 Claims, 3 Drawing Sheets

DUAL-MODE DOWNLOAD MANAGER

TECHNICAL FIELD

This disclosure is related to dual-mode download managers.

BACKGROUND

A Data-Over-Cable Service Interface Specification (DOCSIS) system, for example, can be used to deliver high-definition digital entertainment and telecommunications such as video, voice, and high-speed Internet to subscribers over an existing cable television network. The cable television network can take the form of an all-coax, all-fiber, or hybrid fiber/coax (HFC) network. A multiple service operator (MSO) can deliver these services to subscribers by using a cable modem termination system (CMTS) located at a headend and cable modems (CMs) and customer premise equipment (CPE) devices, such as set-top boxes, multimedia terminal adapters (MTAs), and gateway devices, located at subscriber premises.

A CPE device can either connect to the CM's LAN interfaces, can be embedded with the CM, or can be a separate standalone device. There has been an emergence of devices that embed additional functionality with a CM such as telephony, home networking, and video provided by CPE devices. The DOCSIS specification identifies these embedded devices as eDOCSIS devices. The DOCSIS specification identifies the CM included in the eDOCSIS device as an "embedded CM" or "eCM." Each of the various embedded applications can be identified as an embedded service/application functional entity (eSAFE). The eCM can acts as an entity distinct from other the eSAFEs that are embedded in the eDOCSIS device.

MSOs or vendors, for example, may want to upgrade a CM's firmware and/or software (hereinafter referred to as "software"), for example, to improve performance, accommodate new functions and features, or correct a design deficiency. Software on a CM can be upgraded by downloading a new software image to the CM over the network. The CM can include an upgrade client that implements a download protocol, such as the Trivial File Transfer Protocol (TFTP), to download the new software image.

Similarly, for an eDOCSIS device, MSOs or vendors may want to upgrade any combination of the components in the device (e.g., only the eCM, the eCM and one or more eSAFEs, or only one or more eSAFES). An eDOCSIS device can include an upgrade client that implements a download protocol, such as a TFTP file transfer protocol, to download a new software image or images.

DETAILED DESCRIPTION

Various implementations of this disclosure automatically change the mode of download of a download manager in a CM (or other CPE devices and even remote updates of service operator components) based on the capabilities of a software server. The various implementations described herein are described with reference to a CM, but it should be understood that the concepts disclosed herein can be applied to any device that downloads files. The download manager can send a timeout option to a TFTP server and automatically change the mode of download based on whether a timeout option acknowledgement is received. The download manager can include a first control attribute to enable or disable sending a timeout option to the TFTP server and/or a second control attribute to set the initial download mode of the device. The download manager can automatically change the mode of download from a first mode to a second mode, if the timeout option acknowledgement is received and the mode of download is set to a first mode or automatically change the mode of download from a second mode to a first mode, if the timeout option acknowledgement is not received and the mode of download is set to a second mode.

This disclosure generally describes a download manager for downloading new software to a device. Although this disclosure makes reference to a DOCSIS-based system and CMs specifically, this disclosure is not intended to be limited to a DOCSIS-based system or CMs, but is intended to apply to all implementations for updating software from a remote location.

Figure 1:
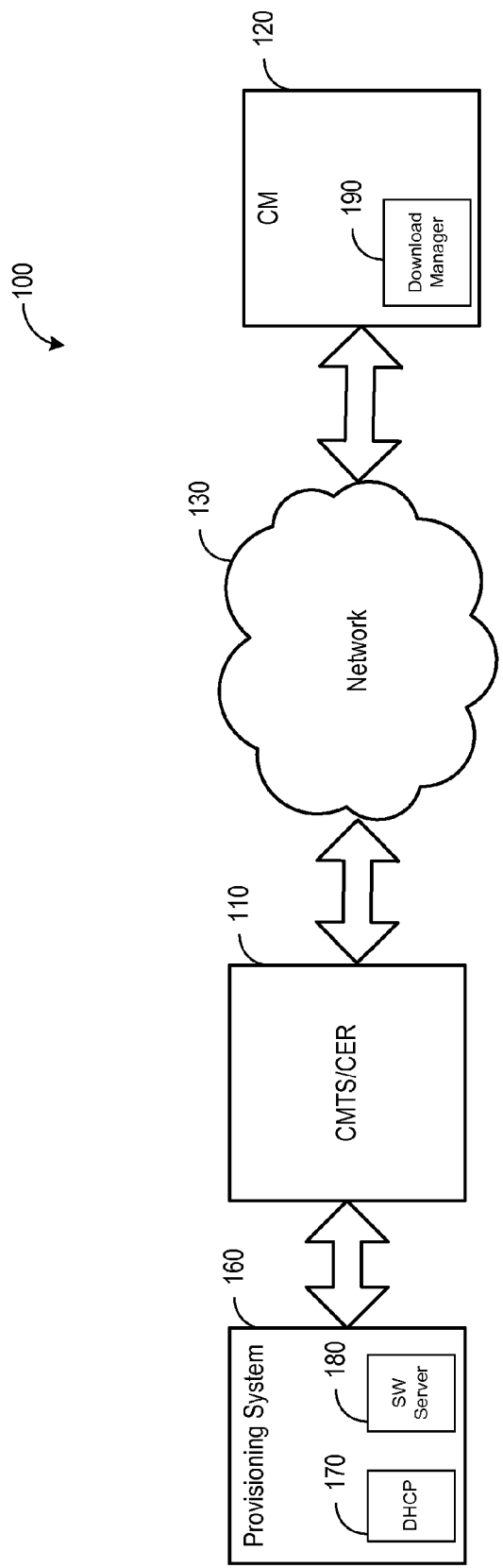
FIG. 1 is a block diagram illustrating an example DOCSIS-based system used to provide communications between a CMTS and a CM over a network.

FIG. 1 illustrates an example DOCSIS-based system operable to deliver high-definition digital entertainment and telecommunications such as video, voice, and high-speed Internet to a subscriber over an existing cable television network. As shown in FIG. 1, traffic (e.g., data, video, and voice signal) can be transferred over a cable network 130 between a CMTS 110 or converged edge router (CER) and a cable modem (CM) 120. The cable network 130 can take the form of an all-coax, all-fiber, or hybrid fiber/coax (HFC) network, however, it should be understood that other types of networks (e.g., wireless or wireline) can be used.

Traffic transferred from the CMTS/CER 110 to the authorized CM 120 can be said to travel in a downstream direction on a downstream channel; conversely, traffic transferred from the CM 120 to the CMTS/CER 110 can be said to travel in an upstream direction on an upstream channel. Once the CM 120 receives traffic from the CMTS 110 via the network 130, the CM 120 can deliver the traffic to another external or embedded CPE device 140.

A provisioning process can be used to authorize a device to communicate traffic over the network. During the provisioning process to become an authorized network element capable of transmitting and receiving traffic over the MSO's cable network 130, the CM 120 can receive via the CMTS/CER 110 an initial configuration file. The configuration file can be received from, for example, a DHCP server 170 of a provisioning system 160. The configuration file can include the file name of software to be loaded on the CM 120 and the IP address of a software server 180 (e.g., a TFTP server) that stores the software. The CM 120 can connect to the software server 180 via the CMTS/CER 110 using the IP address provided in the configuration file. Once connected, the CM 120 can download the software indicated in the configuration file.

The CM 120 can receive a configuration file when it established or re-establishes a connection to the CMTS/CER 110. When there is a software update or change for the CM 120 available via download over the network 130, in some implementations, the MSO can identify the file name of the new software to be loaded on the CM 120 in the configuration file. When the CM 120 downloads the new configuration file after establishing a connection to the CMTS/CER 110, the CM 120 can compare the file name of the software to be loaded on the CM 120 in the new configuration file with the software currently loaded on the CM 120. If the file names do not match (thereby indicating the need to download new software), the CM 120 can connect to a software server using, for example, an address that can be provided in the new configuration file and download the new software. The software server for the new software to be downloaded can be different from the software server storing previously downloaded software. However, for simplicity of illustration and discussion, the software server (e.g., software server 180) in the examples described here are the same for all downloads. It should also be appreciated that, in some implementations, a software upgrade can be initiated via simple network management protocol (SNMP).

The CM 120 can include a download manager 190 to manage the download of new software. For example, the download manager 190 may, for example, pause the download of a file to, for example, erase flash, to perform CRC checks, or to perform any other processing before resuming download of the file. However, the download manager 190 might be operable to employ techniques that are not supported by the software server 180. For example, if the software server 180 is a TFTP server, the TFTP server might not support long pauses in the download. These long pauses in the download can cause the TFTP server to timeout before completion of the download. This timeout by the TFTP server results in an unsuccessful download. Accordingly, it can be desirable to automatically change the mode of download of the download manager 190 based on the capabilities of the software server 180.

Figure 2:
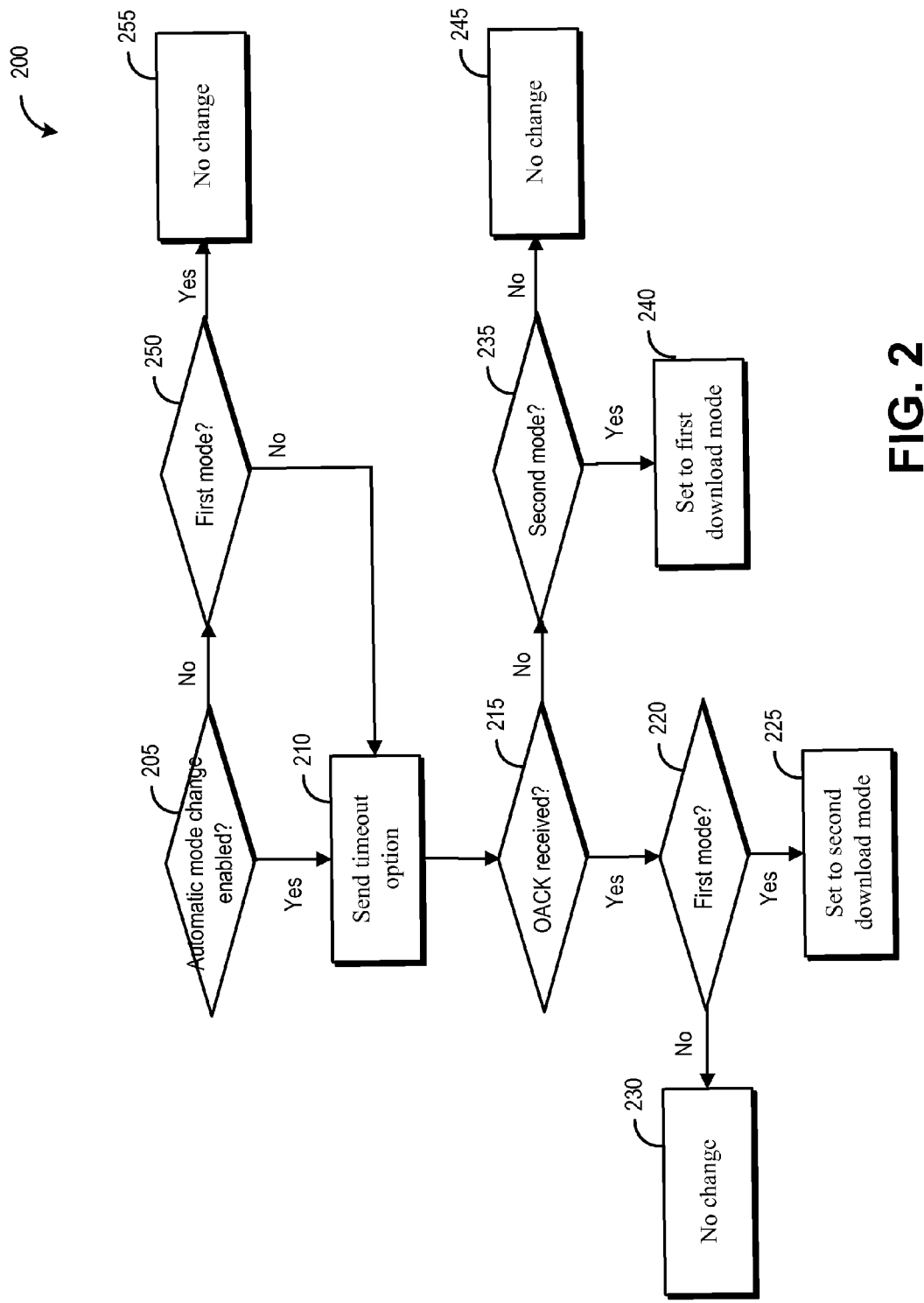
FIG. 2 is a flowchart illustrating an example process for automatically changing the mode of download of a download manager in a CM based on the capabilities of a software server.

FIG. 2 illustrates an example process 200 for automatically changing the mode of download of a download manager in a CM based on the capabilities of a software server. It can be assumed in this example that there is new software to be loaded on the CM (e.g., CM 120 of FIG. 1). It can also be assumed that the software server (e.g., software server 180 of FIG. 1) is a TFTP server that implements the TFTP protocol as described in IETF RFC 1350, K. Sollins, "The TFTP Protocol (Revision 2)", July 1992 (hereinafter "RFC 1350").

In some implementations, the first mode of download of the download manager is designed to have minimum pauses in the download to reduce the chances of timeouts based on the default timeout interval of the TFTP protocol.

In such implementations, the second mode of download can include extended pauses to, for example, optimize the download. These extended pauses can be longer than the default timeout interval of the TFTP protocol and therefore can cause a timeout based on the default timeout interval of the TFTP protocol. Thus, to avoid timeouts and to complete a downloads in the second mode of download, the download manager can negotiate a larger timeout interval with the TFTP server based on the process described in IETF RFC 2349, G. Malkin, A. Harkin, "TFTP Timeout Interval and Transfer Size Options", May 1998 (hereinafter "RFC 2349"). To negotiate a timeout interval with a TFTP server using RFC 2349, the download manager can send a timeout interval option (hereinafter "timeout option") in the read request. The timout option can be used to specify a desired timeout interval. If the TFTP server accepts the timeout option, it sends an option acknowledgment (OACK) to the download manager.

In some implementations, the MSO can set a first control attribute in the download manager to enable or disable the automatic mode change feature of the download manager. For example, a first control attribute that permits a system operator to enable or disable the automatic mode change feature of the download manager can be included as a new object used by a new vendor implemented management information base (MIB) module. In some implementations, the first control attribute can be set to one of two values to specify whether the automatic mode change feature of the download manager is enabled. For example, a first value of the first control attribute can indicate that the automatic mode change feature of the download manager is enabled; a second value of the first control attribute can indicate that the automatic mode change feature of the download manager is disabled.

It also is assumed that the MSO can set a second control attribute in the download manager to set the initial download mode of the download manager. For example, a second control attribute that permits a system operator to set the initial download mode of the download manager can be included as a new object used by a new vendor implemented MIB module. In some implementations, the second control attribute can be set to one of two values to specify whether the initial download mode of the download manager is the first mode or the second mode as discussed above. For example, a first value of the second control attribute can indicate that the initial download mode of the download manager is the first mode; a second value of the second control attribute can indicate that the initial download mode of the download manager is the second mode.

The first and second control attribute can take many forms and this disclosure is not limited to the examples set forth above.

By providing a first and second control attribute to set the automatic mode change feature and initial download mode of the download manager, respectively, download mode decisions can be applied to diverse network conditions as discussed below.

At stage 205, a determination is made whether the automatic mode change feature is enabled. The determination can be made, for example, by the download manager 190 of FIG. 1. In some implementations, this determination is made based on the value of the first control attribute.

If the automatic mode change feature is enabled ("Yes" at stage 205), then a timeout option is sent to the TFTP server at stage 210. The timeout option can be sent, for example, by the download manager 190 of FIG. 1. The download manger sends the timeout option to determine if the TFTP server is configured to support longer pauses in the download and thus support the second mode of download.

At stage 215, it is determined whether an OACK was received from the TFTP server. The OACK can be received, for example, by the download manager 190 of FIG. 1. If an OACK was received ("Yes" at stage 215), then the TFTP server is configured to support longer pauses in the download and thus can support the second mode of download.

Thus, at stage 220, a determination is made whether the first mode of download is set. The determination can be made, for example, by the download manager 190 of FIG. 1.

If the first mode of download is set ("Yes" at stage 220), the mode of download can be set to the second mode of download at stage 225, since it was determined at stage 215 that the TFTP server can support the second mode of download. The mode of download can be set to the second mode of download, for example, by the download manager 190 of FIG. 1.

If the second mode of download is already set ("No" at stage 220), then at stage 230 no change is made to the mode of download of the download manager.

If an OACK is not received ("No" at stage 215), then the TFTP server is not configured to support longer pauses in the download and thus may not be able to support the second mode of download. Thus, at stage 235, a determination is made whether the second mode of download is set. The determination of whether the second mode of download is set can be made, for example, by the download manager 190 of FIG. 1.

If the second mode of download is set ("Yes" at stage 235), the mode of download is set to the first mode of download at stage 240, since it was determined at stage 215 that the TFTP server cannot support the second mode of download. The mode of download can be set to the first mode of download, for example, by the download manager 190 of FIG. 1. If the first mode of download is already set ("No" at stage 235), then no change is made to the mode of download of the download manager at stage 245.

By enabling the automatic mode change feature, the download manager can determine whether the TFTP server can support the second mode of download and automatically can change its mode of download from a first mode to a second mode if the TFTP server can support the second mode of download or from a second mode to a first mode if the TFTP server cannot support the second mode of download.

The system operator may want to set the first control attribute to a first value to enable the automatic mode change feature of the download manager and the second control attribute to a first value to set the initial download mode of the download manager to the first mode if, for example, it is not known beforehand whether the TFTP server can support the second mode of download and the system operator would like the download manager to automatically change modes if the TFTP server can support the second mode of download.

The system operator may want to set the first control attribute to a first value to enable the automatic mode change feature of the download manager and the second control attribute to a second value to set the initial download mode of the download manager to the second mode if, for example, it is known beforehand that the TFTP server can support the second mode of download but the system operator would like a backup mechanism to automatically change the mode of the download manager if the TFTP server cannot support the second mode of download.

Returning to stage 205, if the automatic mode change feature is disabled ("No" at stage 205), then a determination is made at stage 250 whether the first mode of download is set. The determination can be made, for example, by the download manager 190 of FIG. 1.

If the first mode of download is set ("Yes" at stage 250), no change is made to the mode of download at stage 255. In some examples, the system operator may want to set the first control attribute to a second value to disable the automatic mode change feature of the download manager and the second control attribute to a first value to set the initial download mode of the download manager to the first mode if, for example, it is known beforehand that the TFTP server cannot support the second mode of download and the system operator does not want the download manager to change modes.

If the second mode of download is set ("No" at stage 250), then, in some implementations, the process 200 can proceed to stage 210. In this way, there is a backup mechanism to automatically change the mode of the download manager to the first mode if the TFTP server cannot support the second mode of download. In some implementations, if the second mode of download is set ("No" at stage 250), then no change is made to the mode of download. In other words, if the automatic mode change feature is disabled ("No" at stage 205), then, regardless of the mode of download set, no change is made to the mode of download.

The present disclosure is not limited to DOCSIS systems or a CM. The present disclosure can be applied to other communication systems including wired or wireless systems. The present disclosure can be applied to any device that downloads files.

Figure 3:
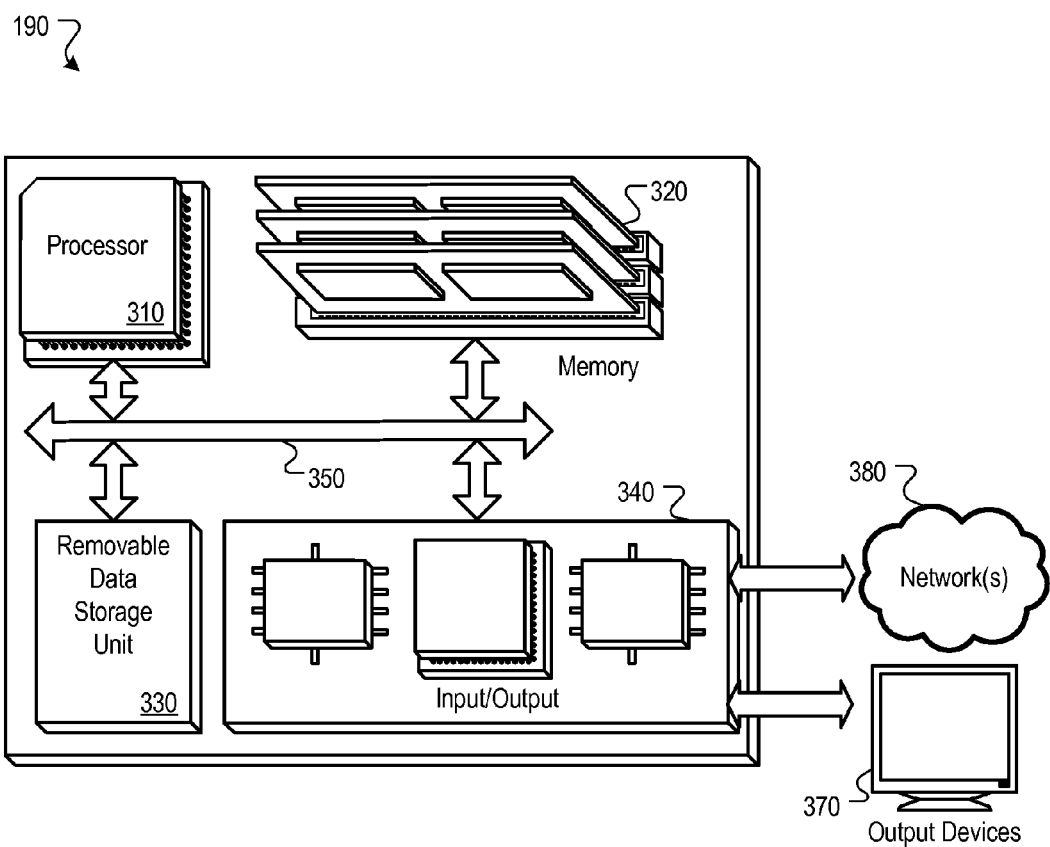
FIG. 3 is a block diagram illustrating download manager in a CM operable to change its mode of download based on the capabilities of a software server.

FIG. 3 illustrates an example download manager 190 operable to perform the example process 200 of FIG. 2. The download manager 190 can include a processor 310, a memory 320, a removable data storage unit 330, and an input/output device 340. Each of the components 310, 320, 330, and 340 can, for example, be interconnected using a system bus 350. In some implementations, the download manager 190 can include one of more interconnected boards where each board comprises components 310, 320, 330, and 340. The processor 310 is capable of processing instructions for execution within the download manager 190. For example, the processor 310 can be capable of processing instructions for executing the process 200 of FIG. 2 in the download manager 190. In some implementations, the processor 310 is a single-threaded processor. In other implementations, the processor 310 is a multi-threaded processor. The processor 310 is capable of processing instructions stored in the memory 320 or on the storage device 330.

The memory 320 stores information within the download manager 190. In some implementations, the memory 320 is a computer-readable medium. In other implementations, the memory 320 is a volatile memory unit. In still other implementations, the memory 320 is a non-volatile memory unit.

In some implementations, the storage device 330 is capable of providing mass storage for the download manager 190. In one implementation, the storage device 330 is a computer-readable medium. In various different implementations, the storage device 330 can, for example, include a hard disk device, an optical disk device, flash memory or some other large capacity storage device.

The input/output device 340 provides input/output operations for the download manager 190. In one implementation, the input/output device 340 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device 340 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for automatically changing the mode of download of a download manager in a device, the method comprising:
   sending a timeout option to a trivial file transfer protocol (TFTP) server for a download of a TFTP file;
   determining whether a response to the timeout option is received;
   automatically using a first TFTP file download mode for downloading the TFTP file, if the response is not received;
   automatically using a second TFTP file download mode for downloading the TFTP file, if the response is received;
   wherein the first TFTP file download mode indicates that the TFTP server is not configured to support long pauses, and the first TFTP file download mode is configured to have minimum pauses in the download to reduce the chance of timeouts based on the default timeout interval of the TFTP protocol; and
   wherein the second TFTP file download mode of download indicates that the TFTP server is configured to support long pauses, and the second TFTP file download mode is operable to include extended pauses that can be longer than the default timeout interval of the TFTP protocol.

2. The method of claim 1, further comprising automatically changing mode if the TFTP file download mode was previously set, based on whether a response is received, automatically changing the mode comprising:
   automatically changing the TFTP file download mode from a first mode to a second mode, if the response is received and the mode of download is set to a first mode; or
   automatically changing the TFTP file download mode from a second mode to a first mode, if the response is not received and the mode of download is set to a second mode.

3. The method of claim 1 further comprises:
   setting a first control attribute to a first or second value to enable or disable, respectively, sending a timeout option to a TFTP server; and
   setting a second control attribute to a first or second value to set the initial download mode of the device.

4. The method of claim 1, wherein the device comprises a cable modem.

5. The method of claim 1, wherein the device comprises an embedded multimedia terminal adapter.

6. The method of claim 1, wherein the device comprises a set top box.

7. The method of claim 1, wherein the TFTP file comprises a new software image to be loaded and executed by the device.

8. The method of claim 7, wherein the new software image comprises an embedded service/application functional entity software image for an embedded component within the device.

9. The method of claim 1, wherein the download manager performs the method responsive to the device receiving a configuration file and identifying that a configuration file software image filename identified by the configuration file differs from a current software image filename identifying a software image currently being used by the device.

10. A computer readable medium having instructions for causing a computer to execute a method for automatically changing the mode of download of a download manager in a device, the method comprising:
    sending a timeout option to a trivial file transfer protocol (TFTP) server to be used in downloading a TFTP file;
    determining whether a response to the timeout option is received; and
    automatically using a first TFTP file download mode to download the TFTP file, if the response is not received;
    automatically using a second TFTP file download mode to download the TFTP file, if the response is received;
    wherein the first TFTP file download mode indicates that the TFTP server is not configured to support long pauses, and the first TFTP file download mode is configured to have minimum pauses in the download to reduce the chance of timeouts based on the default timeout interval of the TFTP protocol; and
    wherein the second TFTP file download mode of download indicates that the TFTP server is configured to support long pauses, and the second TFTP file download mode is operable to include extended pauses that can be longer than the default timeout interval of the TFTP protocol.

11. The computer readable medium of claim 10, further comprising automatically changing mode if the TFTP file download mode was previously set, based on whether a response is received, automatically changing the mode comprising:
   automatically changing the TFTP file download mode from a first mode to a second mode, if the response is received and the mode of download is set to a first mode; or
   automatically changing the TFTP file download mode from a second mode to a first mode, if the response is not received and the mode of download is set to a second mode.

12. The computer readable medium of claim 10, the method further comprising:
   setting a first control attribute to a first or second value to enable or disable, respectively, sending a timeout option to the TFTP server; and
   setting a second control attribute to a first or second value to set the initial download mode of the device.

13. The computer readable medium of claim 10, wherein the device comprises a cable modem.

14. The computer readable medium of claim 10, wherein the device comprises an embedded multimedia terminal adapter.

15. The computer readable medium of claim 10, wherein the device comprises a set top box.

16. The computer readable medium of claim 10, wherein the TFTP file comprises a new software image to be loaded and executed by the device.

17. The computer readable medium of claim 16, wherein the new software image comprises an embedded service/application functional entity software image for an embedded component within the device.

18. The computer readable medium of claim 10, wherein the download manager performs the method responsive to the device receiving a configuration file and identifying that a configuration file software image filename identified by the configuration file differs from a current software image filename identifying a software image currently being used by the device.

19. A system for automatically changing the mode of download of a download manager in a device, the system comprising:
   means for sending a timeout option to a TFTP server;
   means for determining whether a response to the timeout option is received; and
   means for automatically changing the mode of download based on whether a response is received, wherein the means for automatically changing the mode of download comprises automatically using a first TFTP file download mode for downloading the TFTP file, if the response is not received, and automatically using a second TFTP file download mode for downloading the TFTP file, if the response is received;
   wherein the first TFTP file download mode indicates that the TFTP server is not configured to support long pauses, and the first TFTP file download mode is configured to have minimum pauses in the download to reduce the chance of timeouts based on the default timeout interval of the TFTP protocol; and
   wherein the second TFTP file download mode of download indicates that the TFTP server is configured to support long pauses, and the second TFTP file download mode is operable to include extended pauses that can be longer than the default timeout interval of the TFTP protocol.

* * * * *